Dec. 9, 1958    J. B. BATCHELOR, JR    2,864,060
ELECTRICAL COUPLING DEVICE
Filed Aug. 9, 1955    4 Sheets-Sheet 1

Inventor
Joseph B Batchelor Jr
by Carlson, Pitzner, Hubbard & Wolfe
Attorneys

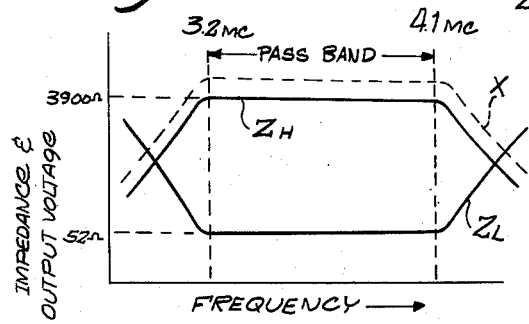
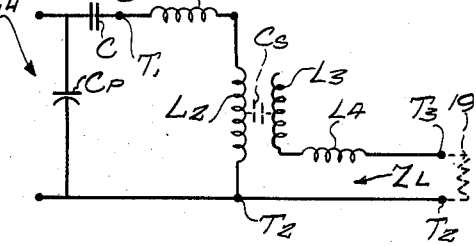
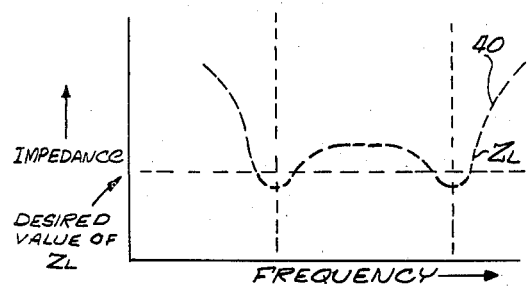
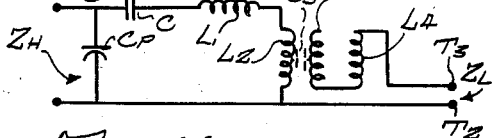
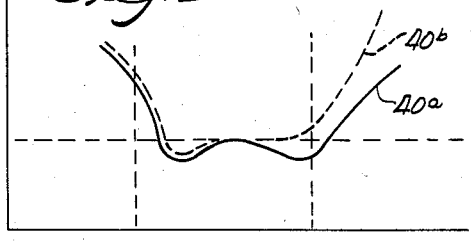

Dec. 9, 1958  J. B. BATCHELOR, JR  2,864,060
ELECTRICAL COUPLING DEVICE
Filed Aug. 9, 1955  4 Sheets-Sheet 3
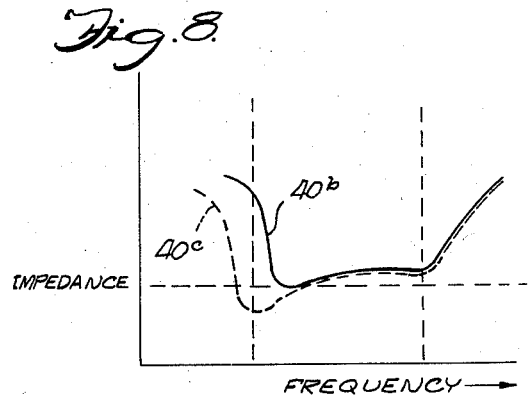
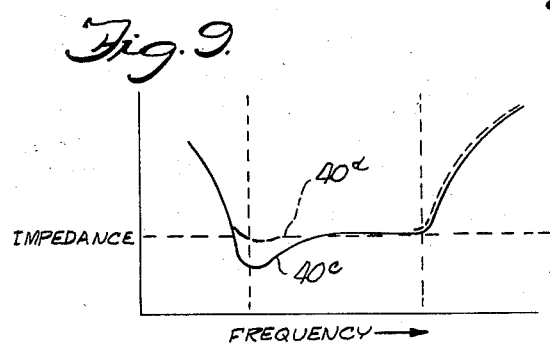
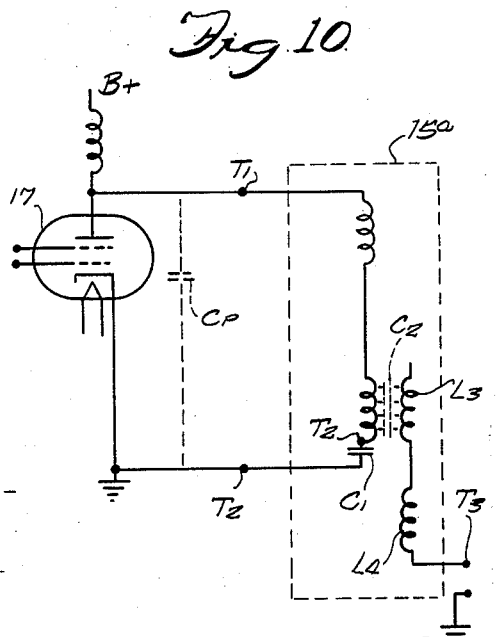
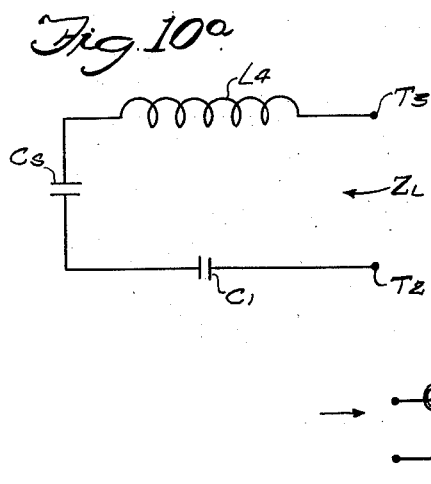
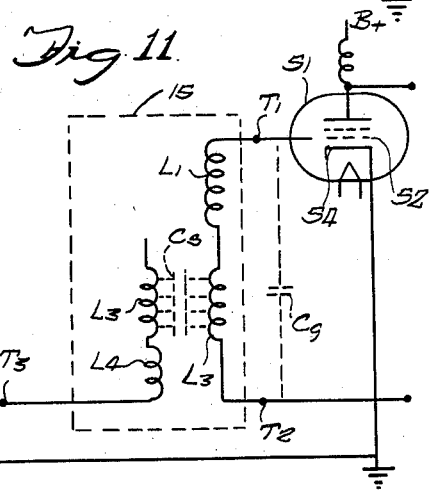
Inventor
Joseph B. Batchelor Jr.
by Carlson, Pitzner, Hubbard & Wolfe
Attorneys Dec. 9, 1958   J. B. BATCHELOR, JR   2,864,060
ELECTRICAL COUPLING DEVICE
Filed Aug. 9, 1955   4 Sheets-Sheet 4

Inventor
Joseph B. Batchelor Jr.
by Carlson, Pitzner, Hubbard & Wolfe
Attorneys

United States Patent Office 2,864,060
Patented Dec. 9, 1958

2,864,060

ELECTRICAL COUPLING DEVICE

Joseph B. Batchelor, Jr., Monroe, Ga., assignor, by mesne assignments, to Patronix Inc., Chicago, Ill., a corporation of Delaware Application August 9, 1955, Serial No. 527,363

7 Claims. (Cl. 333—32)

The present invention relates to coupling devices for transferring variable or adjustable frequency electrical signals between circuits of significantly different impedance. The invention finds particular, although not exclusive, use in the communication art, for example, in applications where it is necessary to couple electrical signals havng a frequency anywhere within a predetermined frequency band from a high impedance plate circuit of a vacuum tube to a low impedance transmission line, or in the opposite sense from a low impedance transmission line to the high impedance grid circuit of a vacuum tube.

It is the primary aim of the invention to provide such a coupling device which gives extremely high efficiency and linear response in transferring variable or adjustable frequency electrical signals between high and low impedance circuits. In this aspect, it is a related object to achieve such a coupling device which prevents high and low impedances at its terminals which match connected high and low impedance circuits over a frequency band of selectable, predetermined width and located at a desired region of the frequency spectrum, the impedances presented by the terminals of the coupling device remaining substantially constant over the predetermined frequency band so that the output signal from the coupling device remains directly proportional, i. e., linearly related, to the input signal to the coupling device over that predetermined frequency band.

As a specific example, the contemplated coupling device may be connected between the plate circuit of an amplifying vacuum tube having a plate resistance of 3900 ohms, and a coaxial cable working into a matched load to present an impedance of 52 ohms. The device may be constructed, in accordance with the invention, to have an input impedance of 3900 ohms and an output impedance of 52 ohms over a range of frequencies from 3.2 to 4.1 mc., thereby providing a uniform amplitude of voltage to the coaxial cable between those frequencies, assuming that the excitation voltage for the amplifier also remains constant as the frequency changes.

It is an ancillary object of the invention to provide a coupling device which is operable at radio frequencies and which provides linear response over a band of frequencies wider than one of the designated communication bands, so that any carrier signal within that band may be accommodated without separately tuning the amplifier as the main tuning circuit of a transmitter or receiver, for example, is adjusted.

Another object is to provide such a coupling device which is operable to provide a frequency pass band of linear response which is selectable to be extremely broad or extremely narrow.

Still another object is to provide such a coupling device which is highly efficient over its entire pass band, giving an efficiency which exceeds that obtainable with π-type coupling networks used heretofore and which was obtainable in such prior networks only at one particular frequency in the pass band.

A further object is to create such a coupling device which gives equally advantageous operation whether connected to transfer signals from a low impedance to a high impedance circuit, or from a high impedance circuit to a low impedance circuit. Additionally, it is an object to provide a coupling device which is self-protecting in that excessive currents, power losses, and heating cannot occur when the output circuit is either short-circuited or open-circuited.

It is an object, moreover, to provide such a coupling device which is "self-shielding" in that it has practically no external electromagnetic fields, with the result that tuning, operation, and efficiency are unaffected by closely spaced metallic parts, and whereby signals are so confined that they are not transferred by spurious inductive coupling to closely spaced circuit elements. Along this line, it is an object to provide such a coupling device which is stable and free of parasitic frequency signals. The invention contemplates such a coupling device which is structurally simple and small, inexpensive to construct, and which requires no variable components which must be tuned or adjusted either initially or during operation. As a result, the present device is ideally suited for applications where weight and space are at a premium and in which the device must be located in a remote or inaccessible position as on aircraft.

Further, it is an object of the invention in one of its aspects to provide a linear radio frequency amplifier especially adapted for use with a single sideband type of exciter and which is capable of putting out a powerful and effective single sideband signal anywhere within a broad frequency band.

Yet another object of the invention is to provide an extremely simple and convenient bandswitching arrangement using the present coupling devices.

Still other objects and advantages of the invention will become apparent as the following description proceeds, taken in conjunction with the accompanying drawings in which:

Fig. 3 is a graph illustrating the response of the coupling device of Fig. 2 and showing variation of input impedance, output impedance, and output voltage, as the input signal changes in frequency;

Fig. 4 is a schematic diagram corresponding to a portion of Fig. 1;

Figs. 4a, 4b, and 4c are similar to Fig. 4 showing by physical relations of windings the predominant inductive couplings during operation in the low, middle and high regions of the frequency pass band.

Figure 1:
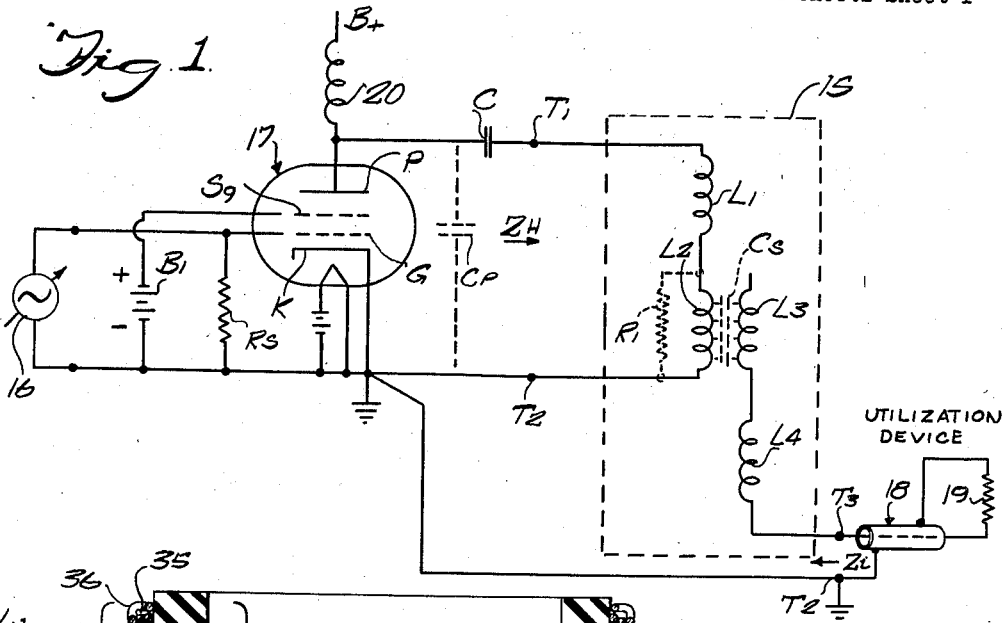
Figure 1 is a schematic circuit diagram of a coupling device embodying the features of the invention as applied in a vacuum tube amplifier circuit to transfer signals into a low impedance load.

Figs. 5–9 are similar to Fig. 3 showing the variation in the low impedance presented by the coupling device with changing frequency and respectively indicating how this low impedance variation is affected by various physical changes in the device in order to arrive at a coupler which presents the desired characteristics;

Fig. 10 is a schematic diagram similar to Fig. 1, illustrating a modification in the coupling device which may be made in order to enhance operation in the lower portions of the frequency spectrum;

Fig. 10a is an equivalent circuit for a part of the circuit shown in Fig. 10.

Figure 2:
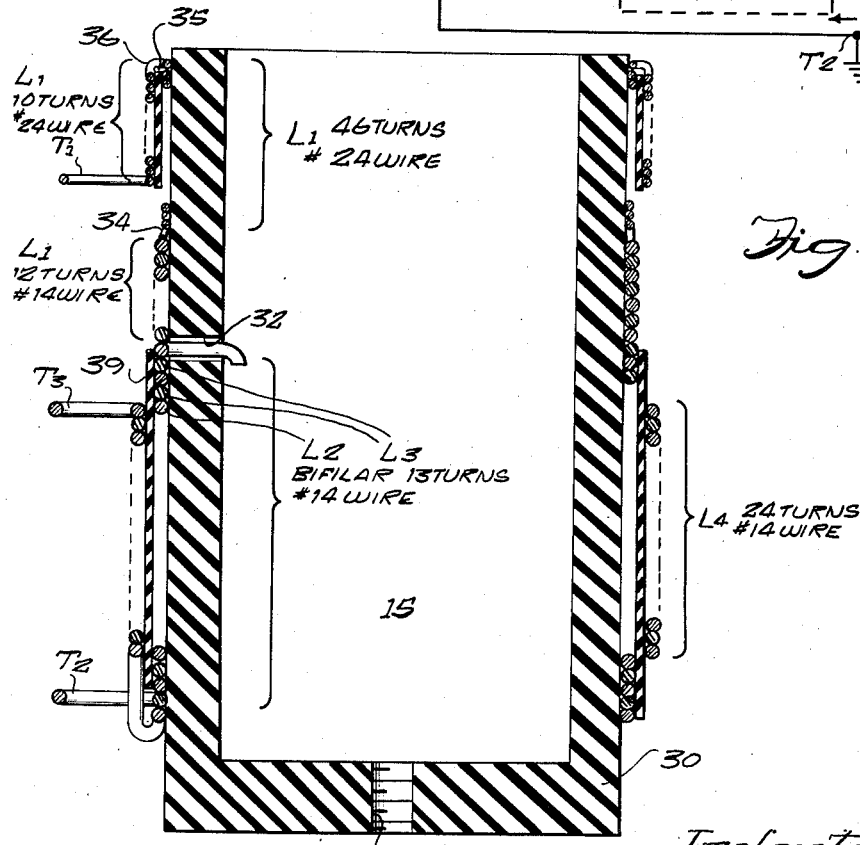
Fig. 2 is a longitudinal section of one form of the present coupling device and intended for use in Fig. 1.
Figure 12:
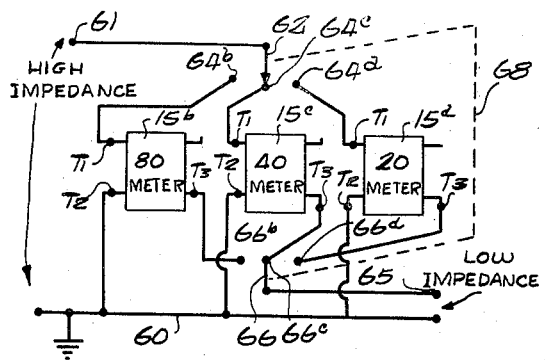
Figure 13:
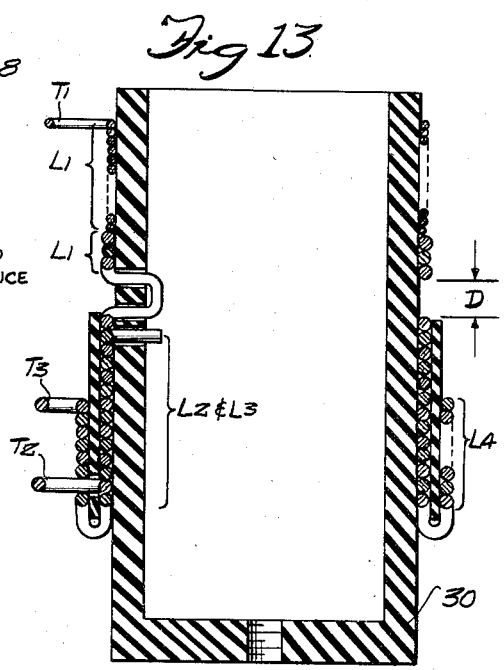
Figure 14:
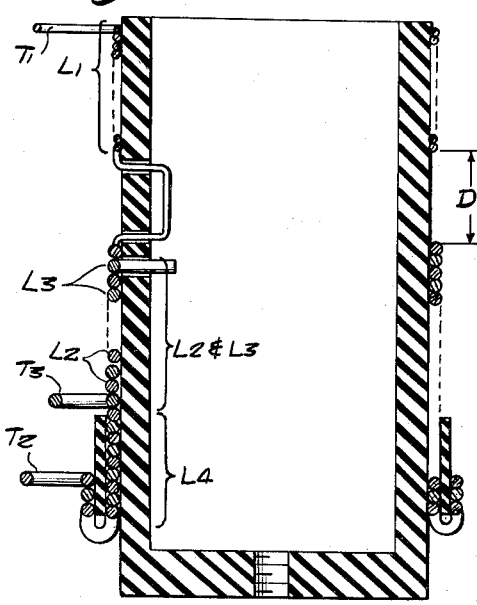
Figure 15:
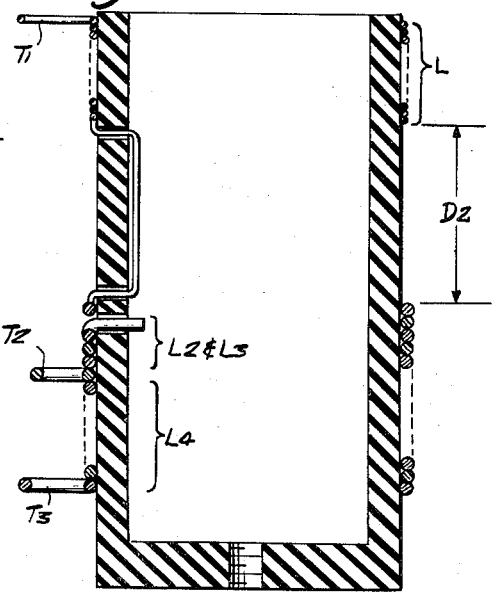

Fig. 11 is a schematic circuit diagram illustrating use of the coupling device in transferring signals from a low impedance circuit to a high impedance circuit;

Fig. 12 is a diagram in block and line form, illustrating a bandswitching arrangement; and Figs. 13–15 are similar to Fig. 2 but show in vertical cross section the structural arrangements and relations of devices intended to provide broadband linear response in the 40, 20 and 10 meter communication bands, respectively.

While the invention has been shown and is described with reference to particular embodiments thereof, there is no intention that it be limited to the details of those illustrated embodiments. On the contrary, the intention is to cover all modifications, alternatives and equivalents falling within the spirit and scope of the invention as defined by the appended claims.

Referring now to the drawings, a broadband amplifier circuit has been there shown (Fig. 1) embodying a coupling device 15 constructed in keeping with the present invention. Such amplifier is intended to receive energizing signals from a source or exciter 16 capable of supplying signals varying both in magnitude and in frequency over a relatively wide range. For amplifying the signal supplied by the exciter 16, a vacuum tube 17, for example, the type 813 tetrode well known in the art, is used in conjunction with the coupling device 15 to feed the signal into a low impedance circuit exemplified by a coaxial cable 18 working into a matched utilization device or load 19.

By way of specific example, the exciter 16 may be of the type capable of producing a modulated single sideband signal at relatively low level and constructed in accordance with the teachings of my copending application Serial No. 371,293, filed July 30, 1953. The load 19 may be a transmitting antenna. The matched coaxial cable 18 and load 19 may present a 52 ohm resistance, while the dynamic plate resistance of the vacuum tube 17 may be on the order of 3900 ohms.

To describe the circuit in more detail, the exciter 16 is connected between the cathode K, which is grounded, and the grid G of the vacuum tube 17, in parallel with any suitable grid leak such as a resistor $Rg$. The screen S of the vacuum tube is supplied with a suitable positive voltage by any means such as a battery B1. The anode or plate P of the vacuum tube is supplied with high voltage indicated conventionally by B+ through a choke inductance 20 which serves as a high impedance at high frequencies. The R. F. output is fed through a capacitor C having negligible impedance in the operating frequency band. The inherent plate-cathode capacity is indicated at $Cp$. The high impedance terminal of the coupler 15 is indicated at T1, the low impedance terminal at T3, and both of the latter work against a ground terminal T2, the device thus constituting a three terminal network.

It is desirable that the high impedance ZH of the coupling device 15 (looking into the terminals T1 and T2) be substantially equal or matched to the effective impedance of the plate circuit of the tube 15, indicated by way of example previously as being approximately 3900 ohms. It is also desirable that the low impedance ZL looking back into the terminals T3 and T2 be matched to the impedance presented by the coaxial cable 18, e. g., 52 ohms. As is well known, maximum energy transfer is achieved when the impedances are thus matched.

And it is most important for uniform or linear response over a wide band of frequencies that this impedance matching be maintained as the frequency of the electrical signal varies. One of the primary disadvantages of prior coupling devices is that such devices require adjustment in order to maintain impedance matching whenever the frequency is changed. One of the objectives long sought in the communications field is the elimination of such adjustments so that the frequency of the transmitter may be adjusted simply by tuning the exciter. This is particularly important where, as in airborne communications equipment, a power amplifier is located at some distance from the tuning unit, making it necessary to resort to expensive servo apparatus.

In accordance with the invention, a coupler is provided having high impedance and low impedance legs arranged in a novel fashion to provide a flat sharply defined pass band. In general terms, the coupling device 15 comprises a high impedance leg including first and second inductive windings which are connected in series to have additive mutual inductance, and which physically may constitute separate portions of one continuous winding connected to the terminals T1, T2. In addition, the coupler includes a low impedance leg having third and fourth windings connected in series, the extremity of the third winding being substantially unloaded, preferably left totally unconnected and floating, while the extremity of the fourth winding provides the third terminal T3 for connection to a low impedance circuit. Of most importance, the second and third windings are arranged in such physical proximity and association that they not only have extremely close transformer-like coupling, but also have a high degree of stray capacitive coupling therebetween. In order to achieve this close inductive and capacitive coupling between the second and third windings, they are preferably wound in compact bifilar relation on the same coil form.

As specifically illustrated by way of example in Fig. 1, the high impedance side of the coupling device 15 comprises two conductive, inductive windings L1 and L2 connected in series to have additive mutual inductance and provide at their respective extremities the two terminals T1 and T2. Normally, the second winding 12 will have a smaller number of turns than the first winding L1. The third and fourth windings L3 and L4 are likewise connected in series and mounted to have additive inductive coupling therebetween, presenting the floating extremity L3 and the third terminal T3. The high stray capacity between the bifilar windings L2 and L3 is illustrated at $Cs$. For simplification in the following analysis this distributed stray capacity will be considered as a single capacitor connected directly between the windings L2, L3.

Fig. 2 illustrates, in enlarged section, the physical structure of an exemplary coupling device intended to provide a linear response with constant impedance matching over a band of frequencies between 3.2 and 4.1 mc. All four of the windings are supported on a common coil form 30 which may be made of ceramic or a similar electrically inert material and shaped as a hollow cylinder closed at its lower end. The diameter of the illustrated form is one inch. A tapped hole 31 may be provided for the reception of a single mounting screw.

While the four windings may be arranged physically in different ways to achieve the same electrical effect in accordance with the invention, this exemplary arrangement will be described in detail. The two windings L2 and L3 are started together at a lower portion of the coil form 30 and wound upwardly in bifilar relation, the two wires being distinguished in the drawing by opposite crosshatching. Thirteen bifilar turns are used and the wire is preferably #14, coated with silicone enamel or other comparable material having good electrical insulating properties and immunity to high temperatures. The lower end of the winding L2 is left free to form the terminal T2. At the upper end of the bifilar windings, the free end of the winding L3 is inserted through a hole 32 in the coil form where it is left totally disconnected and floating. From this point, however, the wire for the winding L2 is wound further upon the coil form to form a first portion of the winding L1 consisting of 12 turns. At this point, a length of #24 wire is soldered or otherwise connected to the upper end of the first section of winding L1 as indicated at 34, and then wound upwardly through 46 turns constituting a second portion of the winding L1. Next, this winding portion is wrapped with a layer 35 of low loss insulating material in the form of tape. After application of the insulating tape, the #24 wire is wound downwardly on top of it to form a 10-turn third portion of the winding L1. The free end is left extending from the coil form for terminal T1. For winding L4, a length of #14 wire is connected to or is formed as a continuation of the lower end of the winding L3 and turned upwardly over a previously applied layer 39 of insulating tape. At a distance approximately 6 turns up from the lower end of the bifilar windings L2 and L3, this latter wire is wound upwardly along the coil form for a distance of 24 turns, the free upper end of L4 comprising the third terminal T3.

Fig. 3 illustrates graphically the operation of the device shown in Fig. 2 when connected as an amplifier coupler as shown in Fig. 1. Assuming the coupler is designed to give a uniform, linear response over the 80 meter band between 3.2 mc. and 4.1 mc., it is desirable also to attenuate frequencies outside this band, for example, in order to prevent passage of second harmonics which might be generated in some of the preceding circuits. As the exciter signal increases in frequency from about 3.0 mc. to 4.3 mc., the impedance ZH presented to the tube plate circuit by the terminals T1 and T2 together with the plate capacity Cp varies as shown by the curve labeled ZH in Fig. 3. The impedance ZH at frequencies below the pass band drops sharply and has been found to be inductive, thus mis-matching the dynamic plate impedance and causing attenuation. However, as the frequency increases to and beyond 3.2 mc., the impedance ZH levels out at a value of approximately 3900 ohms and where it has been found to be substantially resistive. This condition prevails until the frequency increases above 4.1 mc., where the impedance ZH again drops sharply and becomes capacitive to create a mis-match with the plate resistance.

The low impedance ZL presented at the terminals T3 and T2 varies as the mirror image of the impedance ZH. As the frequency starts from a low value, the impedance ZL is relatively high (and capacitive) but reaches a low, resistive value of 52 ohms at 3.2 mc. The impedance ZL remains at this 52 ohm value over the entire pass band but rises sharply at and beyond 4.1 mc. Thus, the coaxial cable 18 is matched to the impedance ZL in the selected pass band for maximum energy transfer, and is considerably mis-matched outside that band to attenuate the signal.

As a result of these impedance changes with frequency, the output voltage, represented by dashed curve V in Fig. 3, varies substantially in the same manner as the high impedance ZH. That is, the output voltage presented at the terminals T3, T2 is relatively low outside of the pass band but rises sharply and stays substantially flat within the pass band where, due to impedance match at both ends, the coupling device 15 permits energy transfer with high efficiency.

Since this pass band is located in the so-called 80 meter portion of the frequency spectrum and is approximately 1 mc. wide, any carrier signal within the 80 meter band may be accommodated with the same response without the necessity for tuning any element of the coupling device 15. Thus, in a transmitter, the entire 80 meter band may be worked by tuning only the exciter 16.

It has been found, moreover, in operation that substantially no external R. F. field exists around the coupling device. Thus, there is no power loss by hysteresis and eddy current effects in adjacent metal components; the device may be mounted in the closest quarters without an external shield. The disclosed circuit (Fig. 1) is preferably biased for class B linear operation. The circuit may, however, be biased as a class C amplifier conducting during only a portion of each positive half cycle of the input signal since the inductive windings L1 and L2 in parallel with the plate capacity Cp give a circuit which supports small circulating currents to give desired fly-wheel action and sine wave output. These circulating currents are very small, however, and the linear character of the device makes the output signal substantially the same as if the amplifier were in class B operation. It has been found that the circulating currents in the parallel circuit created by L1, L2 and Cp are at all times less than 110 percent of the output current so that they result in little power loss. The combined efficiency of a type 813 amplifier tube and the coupling device 15 illustrated in Figs. 1 and 2 is approximately 70 percent over the entire pass band. This is a significant improvement over the efficiency afforded by impedance matching $\pi$-type networks previously employed. These required the careful adjustment of each of three reactive components for maximum efficiency at each one of the frequencies with a given band; yet, with such adjustment, the maximum efficiency of such $\pi$ networks combined with the same type amplifier tube is about 65 percent.

The coupling device 15 is also self-protecting. It is not damaged by excessive current when the terminals T3, T2 are left totally disconnected, or when they are shorted together. When the terminals T2, T3 are open, there is, as now understood, no reflection into or loading of the parallel circuit formed by L1, L2 and Cp. Even though this circuit is not exactly parallel-resonant, it presents an impedance sufficiently great that little current is actually drawn from the tube. On the other hand, when the terminals T3, T2 are shorted, there is, as now understood, a high impedance reflected from the winding L3 into the winding L2 so that it presents a high impedance at the terminals T1, T2. This prevents excessive currents in both the low and high impedance sides.

*Theory of operation*

The diameter of the coil form, the size of the wire employed for each winding, the number of turns in each winding, and the physical relation or spacing of the respective windings are all interrelated factors which contribute to the particularly advantageous operation noted above and illustrated by Fig. 3. By adjustments in these factors, a coupling device may be made to match circuits having any particular high and low impedance values, to provide a pass band which is as narrow or as wide as may be desired, and to locate that pass band in any desired region of the frequency spectrum. The theory of operation of the improved coupling device is not fully understood; and it is not readily explained by mathematical analysis. One theoretical explanation of the operation is given below, although it is possible that other and perhaps equivalent theories may be valid. It will suffice at this point to consider major factors which effect the high impedance ZH, the low impedance ZL, the location of the pass band in the frequency spectrum, and the width of the pass band. For this purpose, the following relations may be stated:

(a) The frequency at the higher end of the pass band is determined primarily by the high impedance circuit capacity, i. e., the plate capacity Cp of the vacuum tube shown in Fig. 1, together with the combined inductance of the windings L1 and L2. This frequency is chosen by making winding L1 of such length that the winding L1, L2 and the capacity Cp are parallel-resonant at the upper end of the band.

(b) The frequency at the lower end of the pass band is determined by the stray capacity Cs between the windings L2 and L3, and by the inductance value of the fourth winding L4. That is, these two reactances are chosen to be substantially series-resonant at the lower end of the pass band.

(c) The band width between the upper and lower frequency limits is determined principally by the stray capacity between the windings L2 and L3, and this stray capacity in turn is dependent upon the length of the bifilar winding, that is, the number of turns for L2 and L3.

At this point, it will be helpful to refer to Fig. 4 which is simply a rearranged schematic diagram of a portion of Fig. 1. While the coupling capacitor C is shown in Fig. 4, it will be understood that such capacitor is large enough to present negligible reactance in the communication frequency range here considered; the capacitor C is simply a direct current isolating device and, beyond that, it may for explanatory purposes be disregarded. With that understanding, the plate capacitance $C_p$ and the winding L1 may be viewed for purposes of explanation as an L network interconnected between a high impedance driving source and the winding L2 as a "load."

Now at the low end of the frequency pass band the capacitance $C_p$ has a relatively high reactance (compared to operation at the high frequency end of the band) and the winding L1 a relatively low reactance. If the impedance from the terminal T1 to the terminal T2 were measured, it would be relatively high; and if the impedance from the junction of the windings L1 and L2 were measured, it would be relatively high (compared to the value measured at the high frequency end of the band). In tests on one embodiment of the invention, the latter impedance was found to be about 500 ohms. On the other hand, the reactance of the capacity $C_s$ is relatively high (compared to operation at the high frequency end of the band), so that the impedance from the junction of the windings L3 and L4 is relatively high. Under these conditions, voltages induced in the windings L2 and L3 due to current flow in L1 produce relatively small currents; there is rather inefficient power coupling between the winding L1 and the windings L2 and L3. By contrast, the impedance from say the middle portion of the winding L4 to ground is relatively low, so that there is rather efficient power transfer by inductive coupling from the winding L1 to the winding L4.

This condition is physically illustrated by Fig. 4a where the winding L4 is shown, merely for explanatory purposes, closely spaced to the winding L1, the two thus having relatively good inductive coupling. Because the series circuit from terminal T3 through winding L4 (plus part of L3) and the capacitance $C_s$ is substantially series-resonant, it has such relatively low impedance as an entire circuit that even though the winding L1 is actually spaced considerably from the winding L4 (Fig. 2), the effective mutual inductance between the two is relatively great and is the predominant factor in the transfer of power between the input and output terminals.

Next, the conditions existing when the frequency is raised to the middle portion of the pass band may be considered. Here, the reactance of the capacitance $C_p$ is lower than before; and the impedance from the junction of windings L1 and L2 to ground is lower. Actual measurements on one device showed this latter impedance to be 375 ohms compared to the 500 ohm value mentioned above. Moreover, the reactance of the capacity $C_s$ is lower than before. As a result, more power is transferred by inductive coupling from the winding L1 to the windings L2 and L3. And because the series circuit formed by winding L4, part of L3, and the capacitance $C_s$ is now operating above resonance, there is a greater voltage drop across these components to offset the greater voltage induced in the winding L3. Thus, the current and voltage values present at the output terminals T2, T3 remain substantially the same as when the signal frequency was in the lower portion of the pass band.

Fig. 4b illustrates physically the predominating means of power transfer during operation in the middle region of the pass band. The windings L1, L2 and L3 are shown closely spaced, for explanatory purposes only, to indicate that, in effect, there is a greater and predominating mutual inductance between them which may be viewed as the principal means of power transfer. The transfer of power by inductive coupling into the winding L4 is less than before since the series circuit L4 (and L3), $C_s$ is now operating above resonance and the impedance from the winding L4 to ground is greater than before.

Finally consider the operation at the high end of the frequency pass band. Here, the reactance of the capacity $C_p$ is still lower than before and the impedance from the junction of the windings L1 and L2 to ground is still lower. It has been measured on the device mentioned above to be about 240 ohms, as contrasted with the values of 500 and 375 ohms previously mentioned for operation at the lower and middle portions of the band. As a result there is extremely good transfer of power from the winding L1 to the winding L2. The latter thus carries larger currents than before and, owing to its closer proximity to the windings L3 and L4 transfers power by inductive coupling to them.

The predominant factor in power transfer is thus between the windings L2, L3 and L4 as indicated in Fig. 4c where those windings are shown closely spaced to indicate, merely by way of explanation, that they have, in effect, a greater and predominating mutual coupling for operation at the high end of the frequency pass band. Relatively high voltages are thus induced in the windings L3 and L4. But because these are part of a series circuit (with the capacitance $C_s$) which operates above resonance and has fairly high impedance, the voltage and current present at the terminals T2, T3 remain substantially the same as before, presenting an effective 52 ohms' resistive impedance to a load looking into those terminals.

It is to be understood, of course, that there is a smooth transition between these typical conditions as the operating frequency is raised from the low to the high end of the pass band. While it is stated for purposes of explanation that power is transferred predominantly by different mutual couplings, it is to be understood also that the other couplings between the several windings are effective to a lesser degree in all instances. As explained above, the low impedance presented at the terminals T3, T2 remains substantially constant (and the output signal linearly related to the input signal) as the frequency changes; the same is true of the high impedance presented by the terminals T1, T2. The high impedance ZH and the low impedance ZL presented by the terminals T2, T3 and T1, T2 respectively remain substantially constant and resistive at the design values over the entire pass band.

*How the coupling device is made*

While the foregoing analysis gives the general theory of operation as it is presently understood, the invention is not to be restricted to that particular theory. The fact remains, regardless of theory, that devices constructed in accordance with the invention have been made by a cut and try or adjustment process, and upon exhaustive tests proven to provide a linear response with high efficiency and substantially perfect impedance matching over any desired frequency range whether narrow or broad. Once a desired frequency pass band or characteristic is obtained by adjustment and tests, coupling devices having that same characteristic may be produced in quantity by following the number of turns, wire sizes, relative spacings, and coil form diameter obtained in the developmental sample. Without regard to theory, the following steps may be employed to arrive at the particular physical size, shape, and spacing of coil forms and windings in order to produce a coupling device having the desired impedance transformation ratio, the desired width of frequency pass band, and the desired location of that band in the frequency spectrum.

In explaining this sequence of adjustments to obtain the enhanced characteristic noted above, reference will be made to Figs. 5–9 which are graphs of the variations in the low impedance ZL versus frequency. It will be understood that the high impedance ZH presented by the terminal T1, T2 is a mirror image of this low impedance ZL, as illustrated in Fig. 3.

To begin, a coupling device is first constructed generally as shown schematically in Fig. 1 and physically in Fig. 2. Since all of the interrelated factors noted above contribute to the frequency response variations in the low impedance ZL, it is likely that this impedance will not vary in the desired manner. For example, it is most likely that the initial selection of the various coil sizes, lengths, spacings and coil form diameter, the impedance ZL will vary as a double-humped curve 40 illustrated by Fig. 5. The impedance ZL will be lower than the desired value at the upper and lower limits of the selected frequency pass band, due to the resonance effects of the parallel high impedance circuit and the series low impedance circuit.

This double-humped response curve is undesirable since it results in non-linear changes of output voltage with respect to input voltage as the frequency changes within the pass band. In order to raise the value of the impedance ZL at the upper end of the pass band, the number of turns in the winding L4 is reduced. This has three effects as shown by the differences between the curve 40 redrawn in Fig. 6 and the resulting reponse curve 40a. First, the entire response curve for the low impedance ZL is rotated upward at its right portion in the higher portion of the frequency band by the amount indicated at M in Fig. 6. Secondly, the reduction in the number of turns for the winding L4 reduces the width of the band from that originally chosen as shown by the distance N in Fig. 6. Finally, this reduction in turns of the winding L4 results in a higher value of the low impedance ZL in the lower part of the frequency band as indicated by the distance O in Fig. 6. The response curve 40a for ZL is thus not yet unsatisfactory.

In order to remove the downward hump at the high end of the response curve in Fig. 6, the winding L1 is uncoupled slightly from the winding L2. This may be done by physically shifting the winding L1 away from the winding portion L2 on the coil form. This results in a change from the response curve 40a, reproduced in Fig. 7, to the response curve 40b shown in Fig. 7, making the impedance ZL substantially equal to the desired value at the upper limit of the frequency pass band. However, the response curve 40b is still undesirable since the lower hump at its left portion is below the desired value of the impedance ZL and it occurs at a frequency above the desired lower limit, thus giving a narrower pass band than intended.

In order to increase the band width, the number of turns for the bifilar windings L2, L3 is increased until the response curve 40b, reproduced in Fig. 8, is changed to that shown by dashed line in Fig. 8. By adding the appropriate number of turns to the bifilar windings, the frequency at which the lower hump in the response curve is shifted back out to the lower frequency limit which is desired, as shown by the resulting response curve 40c. However, the response curve illustrated by 40c is still not satisfactory inasmuch as the impedance ZL is too low at the lower limit of the selected pass band. In order to obviate that difficulty, the coupling between the windings L1 and L2 is increased by placing them in closer proximity, for example, by physically sliding the winding L1 inwardly on the coil form toward the winding L2. This changes the frequency pattern of ZL from the curve 40c, reproduced in Fig. 9 to the desired curve 40d shown in Fig. 9. The result of increasing the coupling between the windings L1 and L2 is, more importantly, an increase in the coupling of the windings L1 and L4 and removes the downward hump which was present in the response curve 40c. It will be apparent that the resulting variation of the impedance ZL with changes of frequency as shown by the curve 40d corresponds exactly to the variations of ZL with frequencies shown in Fig. 3. Accordingly, with these adjustments, the high impedance ZH and the output voltage will also be shaped as shown in Fig. 3 to provide the broadband linear operation described above.

Modified embodiment

Referring next to Fig. 10, there is shown a slight modification of the coupling device illustrated in Fig. 1. The coupling device 15a is constructed and connected in exactly the same manner as previously described except that a small, low voltage capacitor C1 is connected in series with the extremity of the winding L2. Since the capacitor C1 is connected to what was the terminal T2, its opposite side now forms the second output terminal T2' which is connected in circuit as explained above in lieu of the terminal T2.

The advantageous operation of the modified coupling device 15a is substantially the same as that previously described in connection with Figs. 1–3. However, upon reference to Fig. 10a it will be seen that the equivalent low impedance circuit is now modified to include the capacity C1 in series with the inductance L4 and the stray capacity Cs. By the insertion of this capacitor C1, it becomes easier, especially at low frequencies, to adjust the winding L4 so that the low impedance ZL is substantially series-resonant at the low end of the desired pass band. The same compensating effect caused by changes in mutual coupling takes place so that the desired linear response over a wide or narrow band, as desired, is obtained.

Connections for signal transfer from low to high impedance

As indicated above, coupling devices embodying the invention may be operated with equal success and advantage in a "reverse" sense. That is, they may be used to couple a low impedance circuit to a high impedance circuit so that the latter drives the former. As illustrated in Fig. 11, for example, the coupling device 15 may have its second and third terminals T2 and T3 connected to receive energizing signals from a low impedance circuit represented by a coaxial cable 50. The resistance or impedance of this coaxial cable may be relatively low, in the order of 52 ohms, and will be matched by the low impedance presented by the terminals T3, T2. The terminals T1 and T2 are connected to the high impedance grid circuit of a vacuum tube amplifier 51, i. e., respectively to the grid 52 of the vacuum tube and to the grounded cathode 54. By way of example, the cable 50 might lead through a tuning device (not shown) from an antenna, with the tube 52 operating as a first R. F. amplifier in a radio receiver. The inherent small capacity Cg between the grid 52 and the cathode 54 is thus connected in parallel with the windings L1 and L2. Accordingly, as explained before, the windings L1, L2 and the capacity Cg are made substantially parallel-resonant at the upper end of the desired frequency pass band, and the low impedance series circuit made up of the inductance L4, the stray capacity Cs between the windings L2 and L3 made substantially series resonant at the lower end of the frequency band. Thus, the device operates just as previously described, matching the high impedance of the vacuum tube grid circuit and the low impedance of the coaxial cable 50 over the entire pass band to give a linear response in that band.

It will be apparent, also, that more than one of the coupling devices may be employed where it is necessary to match different impedances. Any amplifier stage may have one of the couplers leading in to its grid circuit and another of the coupling devices transferring signals from its plate circuit. Such tandem connection of one or more of the couplers sharpens the attenuation at each end of the linear band.

Band switching

While it is possible by following the teachings of the present invention to construct a coupling device which has a frequency pass band much wider than some of the communication bands, for example, the so-called 160, 80, 40, 20 and 10 meter bands, it is desirable to provide an individual coupling device for each of the several bands in order to prevent the transmission of spurious second harmonics. For example, if in order to accommodate the 80 meter band, a coupling device were employed having band-pass characteristics between 3.2 and 6.4 mc. then the apparatus would pass or transmit second harmonics when operation is at the lower frequency limit. It is for this reason only that the coupling device is not described as operating over a frequency range embracing two or more bands.

The coupling device of the present invention is ideally suited for bandswitching arrangement in transmitters intended for operation over any one of a plurality of frequency bands. The reason for this lies in the fact that the device employs but three terminals, one of which is permanently connected to a common point such as ground. Therefore, in bandswitching arrangements but two contacts need be changed in order to connect one device into the operative circuit and disconnect another device.

Fig. 12 shows an exemplary arrangement for coupling high impedance and low impedance circuits for operation over any one of three bands. Three of the coupling devices, 15b, 15c and 15d have been shown, being constructed, respectively, to provide linear coupling, as described above, over, say, the 80, 40 and 20 meter bands. The terminals T2 of the three coupling devices are all permanently connected to a common connection 60 which may in most cases be ground. Connection for the high impedance circuit is provided by a terminal 61 connected electrically with a movable switch element 62 adapted to selectively contact switch points 64b, 64c and 64d, the latter being connected, respectively, to the terminals T1 of the three coupling devices. Connection of the low impedance circuit is made to a terminal 65 which is electrically connected to a second switch element 66 which may be selectively moved to any one of three switch contacts 66b, 66c, and 66d, tied to the terminals T3 of the three respective coupling devices. The two movable switch elements 62 and 66 are mechanically ganged as indicated schematically at 68 so that any one of the three coupling devices may be operatively connected between a high impedance circuit (connected to the terminals 61 and 60), and a low impedance circuit (connected between the terminals 65 and 60). Since only two connections must be switched in order to change bands, and since there are no variable components which must be adjusted after bandswitching, the arrangement is highly simple and economical in construction and also convenient in use. Bandswitching from a remote control point, as is often necessary in airborne communication equipment, requires but only simple equipment such as a solenoid-actuated stepping switch.

*Structural changes for operation in different bands*

As indicated above, the relative lengths and spacings of the four windings or winding portions in the present coupling device are varied somewhat in order to effect matching of various impedances for input and output circuits, and in order to create band-pass regions of the desired width at a selected location in the frequency spectrum. Figures 13, 14 and 15 illustrate the general physical arrangement for the windings of coupling devices intended for operation over the 40, 20 and 10 meter bands, respectively. In general, as the mean frequency of the desired pass band is raised, closer inductive coupling between the several windings occurs. Moreover, as the mean frequency is increased the capacitance Cs has a lower average reactance. And this results in greater circulating currents in the windings L1, L2, and in the capacitance Cs. This greater current results effectively in higher mutual coupling between the windings L1, and L2. In general, therefore, to offset these effects as coils are made for operation in higher frequency bands the spacing between the several windings may be increased and their respective lengths decreased.

In Fig. 13, for example, where the coupling device is intended to operate over the 40 meter band, the first winding L1 has fewer turns than illustrated in Fig. 2. However, these turns are made up of a first portion of small diameter wire leading from the terminal T1 and connected directly into a continuing portion of larger wire. The winding L2 is spaced by the distance D from the winding L1, although connected in series therewith, by inserting the lower end of the portion L1 though the coil form 30 and back out at a lower point where the winding L2 begins. The windings L2 and L3 are disposed in bifilar relation, but have fewer turns than in the lower frequency device illustrated by Fig. 2. In order, however, to provide the desired coupling between the winding L3 and the fourth winding L4, the latter is turned upwardly from its series connection to the lower end of the former and wound over a layer of insulating material. The terminal T3 is formed by the upper extremity of the winding L4.

The coupling device illustrated in Fig. 14 for operation in the 20 meter band is constructed substantially the same. However, in this instance, since the frequency is higher, the spacing between the series connected windings L1 and L2 may be considerably greater, here shown by the dimension D1. Also, because the frequency of operation is higher, the fourth winding L4 need not be so closely spaced to the windings L2 and L3. Thus, the winding L4 may be wound directly on the surface of the coil form. The last few turns of the winding L4, however, are turned upwardly and wound back upon the earlier turns in order to obtain the necessary coupling.

Substantially the same arrangement is employed in the form shown by Fig. 15, intended for use in the 10 meter band. Here, the first winding L1 has a relatively small number of turns and is separated by a relatively great distance D2 from the winding L2. Moreover, because the frequency is higher, the desired coupling between the bifilar windings L2, L3 to the fourth winding L4 is obtained by winding the latter directly on the surface of the coil form and, in fact, spacing the winding L4 slightly away from the bottom portion of the winding L3. In all of these specific embodiments of the coupling device, the same advantageous impedance matching and predetermined band width of operation are obtained. The actual physical relationships may be determined in the first instance by the procedure described above. Once that is done, devices having the same characteristics may be made in quantity by physically copying the first developmental sample.

As indicated above and shown in Figs. 2 and 13–15, the wire employed to form the winding L1, or more fully, the continuous wire which forms the series connected windings L1 and L2, is made up of several sections having different diameters. More specifically, the wire which is used for the windings L1 and L2 is graduated or tapered in diameter from a relatively small size at the terminal T1 to a considerably larger size at the terminal T2. This tapering or graduation of wire compensates for the fact that circulating currents in the parallel high impedance circuit are small at the terminal T1 and progressively greater in magnitude in portions of the windings L1 and L2 which are closer to the terminal T2. Thus, in order to prevent overheating and charring of the enamel on the wire, the wire is progressively increased in diameter in order to have less resistance and less power loss per unit length. This change in the magnitude of circulating current apparently results from the fact that the impedance to ground from near the top end of the winding L1 is high and is lower from progressively lower points on that winding. The circulating current is thus greater in the lower portions of the winding L1.

While the invention has been described with numerous references to operation to certain frequency bands, it is to be understood that this is by way of example only, and that the invention may be employed, in accordance with the teaching herein, at various regions of the signal frequency spectrum.

I claim:

1. A three-terminal coupling device for providing a substantially linear transmission response between relatively high and low impedance circuits over a predetermined frequency range of electrical signals, said device comprising, in combination, first and second windings connected in series to present first and second terminals and mounted to have inductive coupling therebetween, third and fourth windings connected in series and mounted to have inductive coupling therebetween, said second and third windings being intimately associated physically to have both high inductive coupling and high stray capacity coupling therebetween, said third winding having an extremity remote from its connection to said fourth winding and which is unconnected, and said fourth winding having an extremity remote from its connection to said third winding and forming a third terminal for paired connection with said second terminal.

2. A three-terminal coupling device comprising, in combination, first and second windings connected in series to present first and second terminals at their respective opposite ends and disposed in inductively coupled relation, third and fourth windings connected in series and disposed in inductively coupled relation, said second and third windings being wound in bifilar fashion to have intimate inductive and stray capacity coupling therebetween, the end of said third winding remote from the fourth winding being left disconnected and floating, and the end of said fourth winding remote from said third winding constituting a third terminal paired for connection to a circuit with said second terminal.

3. A three-terminal device for coupling high and low impedance circuits with a linear response over a predetermined frequency range of electrical signals, said device comprising, in combination, first and second series-connected, inductively coupled windings presenting respectively first and second terminals for connection to the high impedance circuit, third and fourth series-connected, inductively coupled windings, the extremity of said third winding being unconnected and floating and the extremity of said fourth winding remote from said third winding constituting a third terminal for paired connection with said second terminal to a low impedance circuit, said second and third windings being wound in bifilar fashion to have intimate inductive and capacitive coupling therebetween, said windings being sized and spaced to effect changes in the relative mutual couplings therebetween as frequency of the electrical signals is varied.

4. A three-terminal electric coupling and impedance matching device comprising, in combination, first and second conductive windings connected in series to present first and second respective terminals adapted for connection to a high impedance circuit having inherent capacity, said first and second windings being located in proximity to cause inductive coupling therebetween and having an inductive reactance substantially equal to the inherent capacitive reactance of the high impedance circuit at the upper frequency region of a predetermined pass band, third and fourth conductive windings connected in series to present two respective extremities, the extremity of the third winding being left unconnected and the extremity of said fourth winding forming a third terminal adapted for connection with said second terminal to a low impedance circuit, said second and third windings being wound in bifilar relation to have high transformer and capacitive coupling therebetween, said fourth winding having an inductive reactance substantially equal to the capacitive reactance of the coupling between said second and third windings at the lower region of said predetermined pass band, the bifilar length of said second and third windings determining the width of the frequency pass band in which the response of said device is substantially linear.

5. A three-terminal electric coupling and impedance matching device for giving a linear transfer of electric signals between high and low impedance circuits over a frequency band of selectable width and at a selectable region of the frequency spectrum, said device comprising in combination, a coil form, first and second windings located on said coil form to have additive mutual inductive coupling and connected in series to present first and second terminals adapted for connection to the high impedance circuit, said first and second windings being sized to be parallel-resonant with the inherent shunt capacity of the high impedance circuit at the upper region of the selected pass band, third and fourth windings located on said coil form and connected in series to have additive mutual inductive coupling, the free end of said third winding being left unconnected and the free end of said fourth winding forming a third terminal adapted to be connected with said second terminal to the low impedance circuit, said second and third windings being wound in bifilar relation to have high inductive and capacitive coupling therebetween, said fourth winding being sized to be substantially series resonant with the capacitive coupling between said second and third windings at the lower region of the selected pass band, whereby mutual couplings between said windings change with frequency in the pass band to maintain the response linear over the pass band.

6. The combination set forth in claim 1 further characterized by the presence of a capacitor connected in series with said second winding.

7. The combination set forth in claim 4 further characterized by the presence of a capacitor having one side thereof connected to said second winding and the other side thereof forming said second terminal, said fourth winding having an inductive reactance substantially equal to the series combination of reactance of said capacitive coupling and said capacitor in the lower region of the predetermined pass band.

References Cited in the file of this patent

UNITED STATES PATENTS

| | | |
|---|---|---|
| 1,897,633 | Dalpayrat | Feb. 14, 1933 |
| 1,933,402 | Wheeler | Oct. 31, 1933 |
| 2,092,885 | Kirkwood | Sept. 14, 1937 |
| 2,130,824 | Jones et al. | Sept. 20, 1938 |